United States Patent
Ferrari et al.

(10) Patent No.: US 9,610,812 B2
(45) Date of Patent: Apr. 4, 2017

(54) TIRE BEAD EXTRACTION DEVICE FOR TIRE-CHANGING MACHINES

(71) Applicants: Gino Ferrari, Correggio (IT); Franco Maioli, Correggio (IT)

(72) Inventors: Gino Ferrari, Correggio (IT); Franco Maioli, Correggio (IT)

(*) Notice: Subject to any disclaimer, the term of this patent is extended or adjusted under 35 U.S.C. 154(b) by 268 days.

(21) Appl. No.: 14/371,176

(22) PCT Filed: Jan. 16, 2013

(86) PCT No.: PCT/IB2013/050384
§ 371 (c)(1),
(2) Date: Jul. 8, 2014

(87) PCT Pub. No.: WO2013/108181
PCT Pub. Date: Jul. 25, 2013

(65) Prior Publication Data
US 2015/0053354 A1    Feb. 26, 2015

(30) Foreign Application Priority Data
Jan. 16, 2012   (IT) .............................. MO2012A0009

(51) Int. Cl.
*B60C 25/138*   (2006.01)
*B60C 25/04*    (2006.01)
*B60C 25/05*    (2006.01)

(52) U.S. Cl.
CPC ............ *B60C 25/138* (2013.01); *B60C 25/04* (2013.01); *B60C 25/0578* (2013.04)

(58) Field of Classification Search
CPC .... B60C 25/138; B60C 25/04; B60C 25/0578
See application file for complete search history.

(56) References Cited

U.S. PATENT DOCUMENTS 7,048,026 B2 * 5/2006 Bonacini ............... B60C 25/138
157/1.17
7,128,119 B2 * 10/2006 Corghi ............... B60C 25/0578
157/1.22

(Continued)

FOREIGN PATENT DOCUMENTS

| EP | 1593533 | 11/2005 |
| EP | 2233325 | 9/2010 |
| WO | 2010026539 | 3/2010 |

*Primary Examiner* — David B Thomas
(74) *Attorney, Agent, or Firm* — Themis Law

(57) ABSTRACT

A tire-lever device for tire-changing machines includes a substantially vertical support arm associated with a tire-changing machine and having upper and lower ends; a pair of substantially vertical and parallel plates integrally extending from the opposite lower end; a connecting rod system, hinged between the pair of plates and including first and second connecting rods; a tire-lever tool with an elongate body defining an upwardly-facing first end and a second end opposite thereto, formed as a hook portion and hinged to the first and second connecting rods and forming an articulated quadrilateral with the latter and said plates; an actuator rotatably actuating the connecting rod system and mounted onto the support arm; a connector element connecting the actuator to the connecting rod system and defining an end hinged to the actuator and an opposite end directly hinged to the first end of the elongate body of the tire-lever tool.

8 Claims, 4 Drawing Sheets

(56) References Cited

U.S. PATENT DOCUMENTS

| | | | | |
|---|---|---|---|---|
| 7,455,096 B2* | 11/2008 | Bonacini | ............... | B60C 25/138 157/1.17 |
| 7,497,761 B2* | 3/2009 | Gonzaga | ............... | B60C 25/138 157/1.17 |
| 7,743,812 B2* | 6/2010 | Sotgiu | ................. | B60C 25/0578 157/1.24 |
| 7,896,054 B2* | 3/2011 | Bonacini | ............. | B60C 25/0578 157/1.24 |
| 8,291,958 B2* | 10/2012 | Bartoli | ................ | B60C 25/0578 157/1.17 |
| 8,752,605 B2* | 6/2014 | Gonzaga | ............... | B60C 25/138 157/1.3 |
| 8,869,864 B2* | 10/2014 | Bonacini | ............. | B60C 25/0578 157/1.24 |
| 8,910,693 B2* | 12/2014 | Gonzaga | ............. | B60C 25/0578 157/1.17 |
| 8,973,640 B1* | 3/2015 | Hanneken | ............. | B60C 25/138 157/1.17 |
| 9,090,135 B2* | 7/2015 | Magnani | ............... | B60C 25/138 157/1.17 |
| 9,139,055 B2* | 9/2015 | Bonacini | ............. | B60C 25/0578 157/1.17 |
| 9,216,621 B2* | 12/2015 | Barbetti | ................ | B60C 25/132 157/1.17 |
| 2010/0243173 A1* | 9/2010 | Bartoli | ................ | B60C 25/0578 157/1.24 |
| 2011/0155329 A1* | 6/2011 | Magnani | ............... | B60C 25/138 157/1.17 |
| 2013/0139973 A1* | 6/2013 | Bonacini | ............... | B60C 25/132 157/1.24 |

* cited by examiner

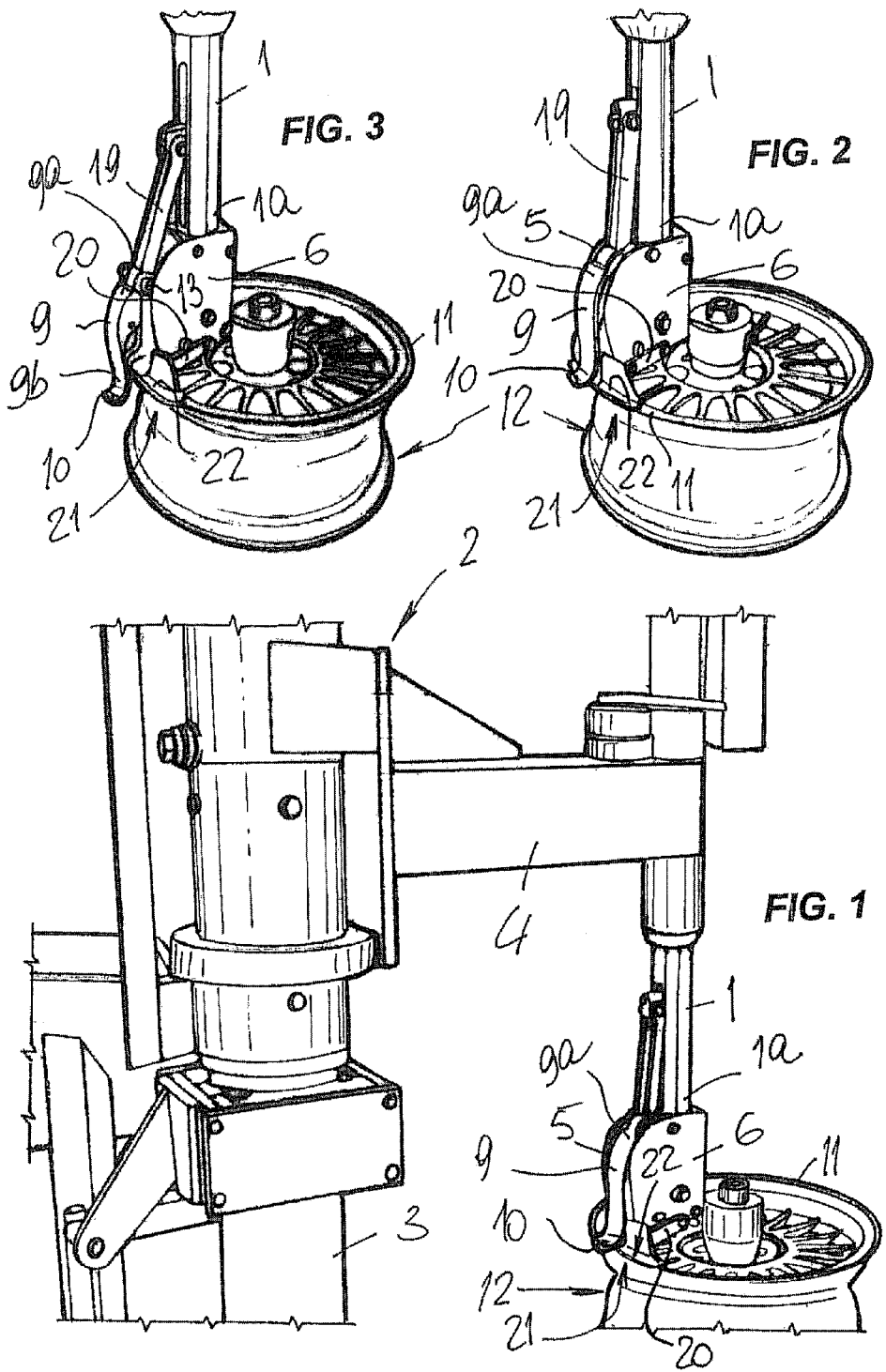

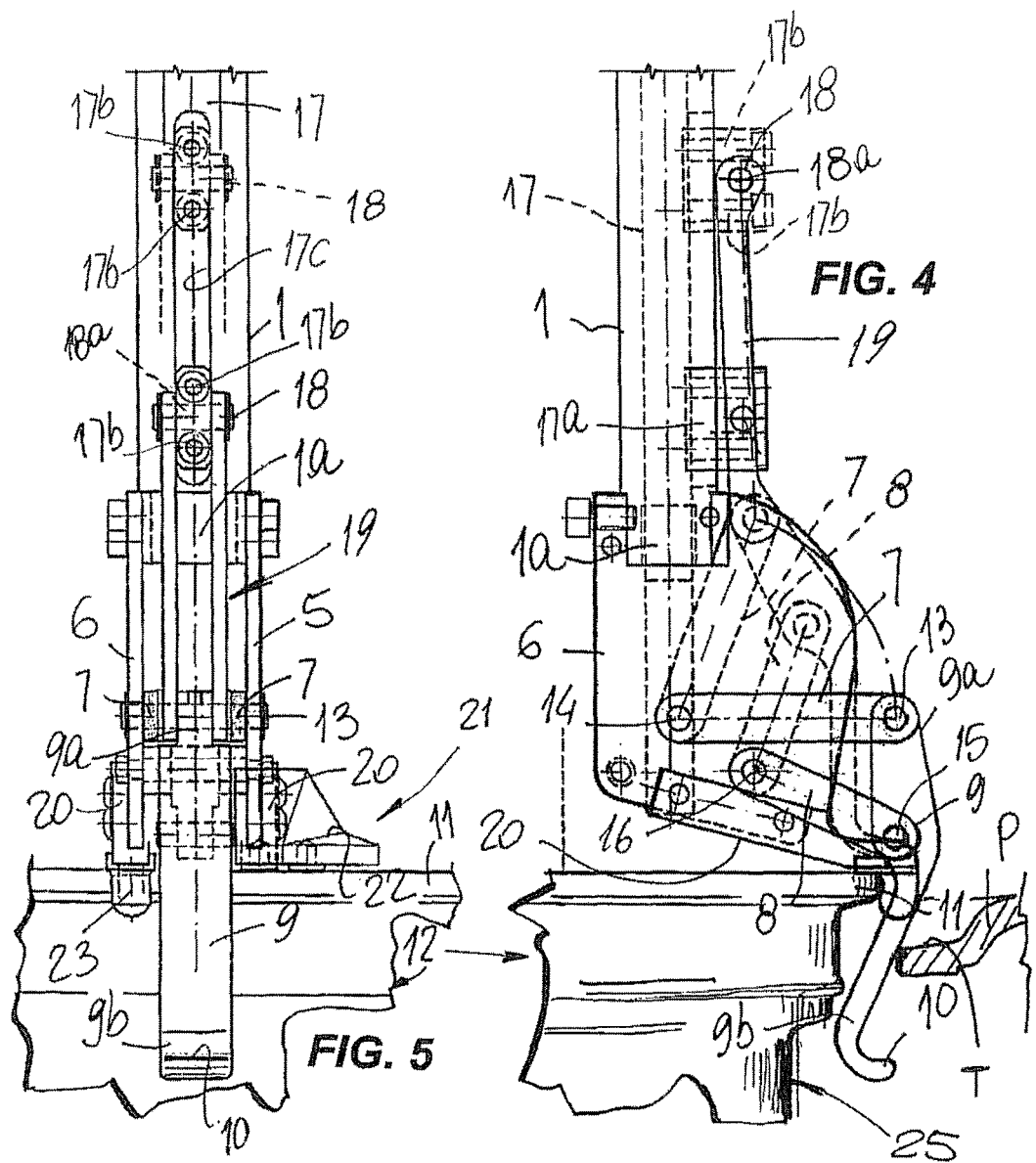

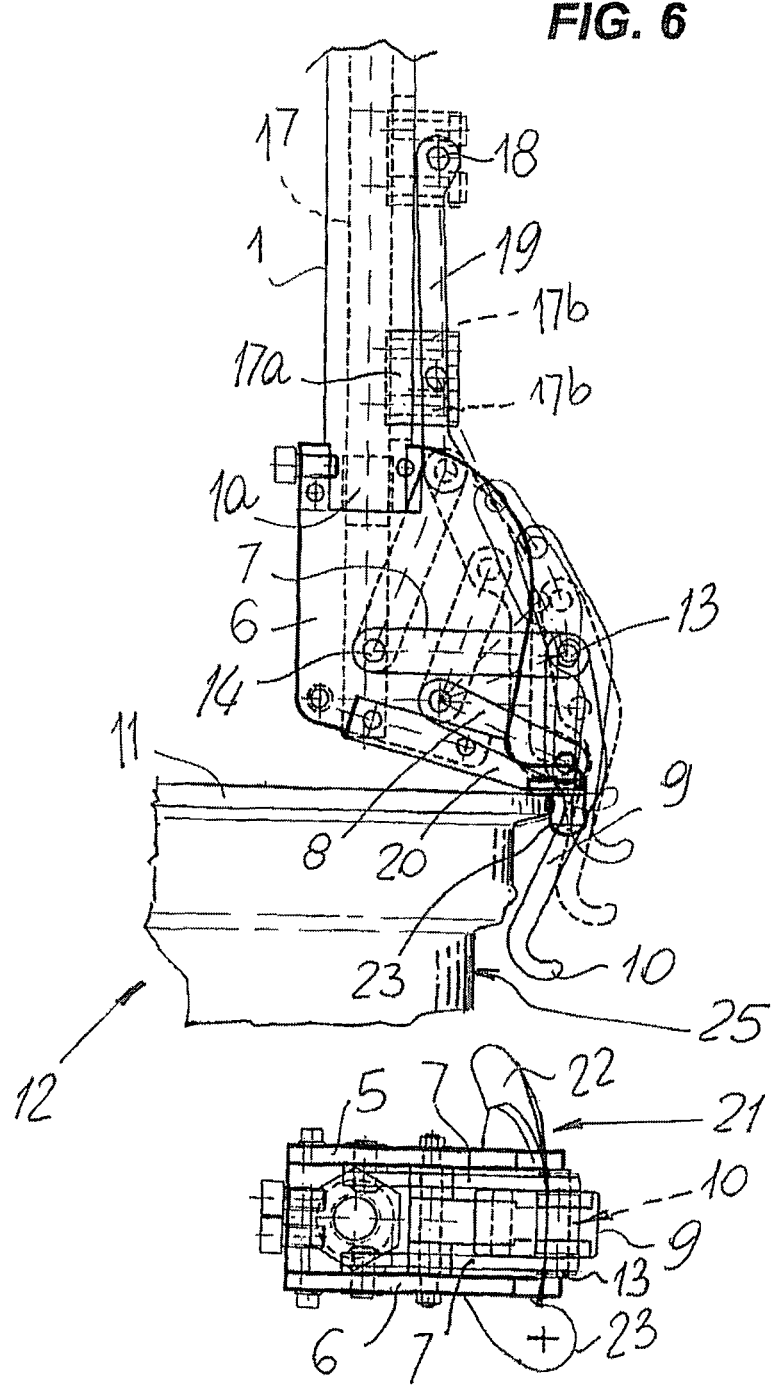

TIRE BEAD EXTRACTION DEVICE FOR TIRE-CHANGING MACHINES

FIELD OF THE INVENTION

The invention relates to a tire-lever device for tire-changing machines, particularly for extracting tire beads from the rims on which they sit, without requiring any manual action by an operator, who uses a lifting lever, as is known in the art.

BACKGROUND ART

Devices are known for separating the tire beads from the rims on which they sit.

As is known, a tire bead is the part of the tire sidewall that extends from the circumference of the inner edge and the outer circumference connecting the sidewall to the tread and that, with the tire inflated, is designed to permanently lie in secured fashion on the peripheral edge of a wheel rim on which the tire sits.

Typically, after intensive use of the tires, due to the constant thrust exerted against the rim edges, beads tend to maintain their adhesion strength thereupon.

For this reason, when a tire changer has to demount a tire from its rim, he/she will first deflate it and then repeatedly press its beads toward the central tire fitting groove of the rim, using a pneumatically-operated blade-shaped press tool, with which tire-changing machines are equipped on one sidewall of their base, thereby loosening the tire from the rim.

Then, he/she will lay and lock the wheel with the loosened tire on the working platform provided in every tire-changing machine, move the operating arm of the tire-changing machine, having a bead-breaking tool, toward the tire bead, and hold a specially shaped lever to manually lift a small portion of the upper bead from the rim edge to pass over it, and fit the lifted portion onto the bead breaking tool.

Finally, he/she rotates the platform and the tire bead will progressively pass over the entire edge of the rim, thereby allowing tire demounting.

In the prior art, automatically operating bead breaking devices are also known, which allow operators to avoid the use of the lever.

A device of this type is disclosed in EP 1 593 533.

This patent provides a vertical operating arm which carries a pair of vertical and parallel plates, with a hook mounted therebetween, which is connected to the plates by means of two connecting rods, thereby forming an articulated quadrilateral in which the hook forms an outer side.

The hook has a roto-translational motion and is driven by two gears mounted between one of the connecting rods and the two parallel plates, said gears being rotatably integral with the connecting rod and a pivot transversely supported between the two vertical and parallel plates.

The two gears have respective teeth, which are mutually engaged for rotary motion transfer.

The pivot also has the end of an additional coupling rod keyed thereon, said connecting rod having its opposite end hinged to the lower end of the shaft of an actuator cylinder, which is mounted along the operating arm and integral therewith.

When the cylinder is actuated by the tire changer, the additional coupling rod rotates and causes integral rotation of the pivot and the gear rotatably fixed thereto.

The rotation of this gear forces the second gear into rotation, and the latter rotates the two connecting rods that form the articulated quadrilateral.

Therefore, the hook is moved toward or away from a predetermined introduction point between a tire bead and the edge of a rim on which it sits.

The compound roto-translational motion allows the hook to perform introduction or extraction movements between the bead and the rim edge along a path that passes over the rim of the edge, without impacting it.

Therefore, when the hook is moved back for extraction, it catches the tire bead and lifts it over a portion beyond the rim edge, thereby actually automatically carrying out the step that a tire changer carries out when he/she handles the bead breaking lever, to place the lifted bead portion on a bead breaking tool with which the tire-changing machine is equipped.

This prior art suffers from certain drawbacks.

A first drawback consists in that, in tire changing machines in which a lever must be manually operated to lift the tire bead segment to be demounted from the rim edge, tire changers are required to use their physical strength and when multiple tire demounting steps must be carried out in one working day, the effort progressively accumulates and becomes significant at the end of the working day.

This drawback is even more serious when the tires to be demounted are of special type, i.e. tires having lower sidewalls than standard tires.

Bead lifting by the lever becomes even more difficult and wearing due to the structural rigidity of the carcass of this type of tires, which must be able to limit its elastic lateral bending to limit the cornering slip angle of the vehicle to which they are mounted.

A further drawback of prior art automatic bead breaking devices, i.e. those that do not require manual use of the lever, particularly as described above, consists in that they have a very complicated structure, composed of a considerable number of parts connected together by hinges, which also include, as mentioned above, gears with mutually engaged teeth.

This involves both considerable costs for making the individual parts and assembling them to form the bead breaking device, and, due to wear, progressive increase of the clearances between the parts and the great number of hinges that connect them together, as well as the teeth of the gears that transfer the action of the actuator cylinder to the hook to convert it into roto-translational movements.

This increase of the clearances is directly proportional to the number of parts that are used to form the bead breaking device and worsens inaccuracy of the action of the hook that is designed first to fit between the bead and the rim edge, and then to lift the bead portion.

In certain cases, this inaccuracy may cause a considerable deviation of the operating roto-translational paths originally designed for the hook, thereby possibly causing it to impact or slip against the rim edge and damage it, during both introduction and extraction.

Furthermore, such deviations of the optimal paths change the angle of introduction of the hook between the tire bead and the rim edge.

Such angle changes may increase the bending resistance of the bead, upon pressure of the hook, to as it is moved toward the tire fitting groove, and conversely cause an unsteady bead hooking action during the extraction lifting step.

DISCLOSURE OF THE INVENTION

One object of the invention is to improve the prior art.

Another object of the invention is to provide a tire-lever device for tire-changing machines, that considerably increases the simplicity and cost-effectiveness of the structure of automatic tire-lever devices.

A further object of the invention is to provide a tire-lever device for tire-changing machines that allows quick extraction of tire beads from the rims on which they sit, without damaging the rims.

Another object of the invention is to provide a tire-lever device for tire-changing machines, that maintains the proper working angle with time.

In one aspect the invention relates to a tire-lever device for tire demounting machines as defined by the features of claim 1.

The dependent claims define particular embodiments of the tire-lever device for tire-changing machines of the invention.

The invention affords the following advantages:

significantly simplifying the structure and operation of the tire-lever devices for tire-changing machines, by making them thinner and lighter;

automatically extracting the tire beads from the rims on which they sit with easy and secure actions, thereby preserving the integrity of the rims and the tires;

maintaining a fixed orientation of the tire-lever device during operation;

also facilitating tire mounting; and generally reducing the costs of tire changing machines.

BRIEF DESCRIPTION OF THE DRAWINGS

Further characteristics and advantages of the invention will be more apparent upon reading of the detailed description of one preferred, non-exclusive embodiment of a tire-lever device for tire-changing machines, which is illustrated by way of example and without limitation in the annexed drawings, in which:

FIG. 1 is a broken away side view of a tire-changing machine having a tire-lever device for tire-changing machines of the invention;

FIG. 2 and FIG. 3 show two operating steps of the tire-lever device of FIG. 1 on a rim from which the tire has been removed, to better show the operation of the invention;

FIG. 4 is a schematic broken away, ghost view of the tire-lever device of the invention, as shown in two end operating positions;

FIG. 5 is a corresponding front view of the tire-lever device of FIG. 4;

FIG. 6 is a schematic, reduced-scale, ghost side view of the tire-lever device of the invention in which broken lines indicate the positions of the tire-lever device during operation;

FIG. 7 is a corresponding top view of the tire-lever device of FIG. 6;

DETAILED DESCRIPTION OF A PREFERRED EMBODIMENT

Figures 8, 9:
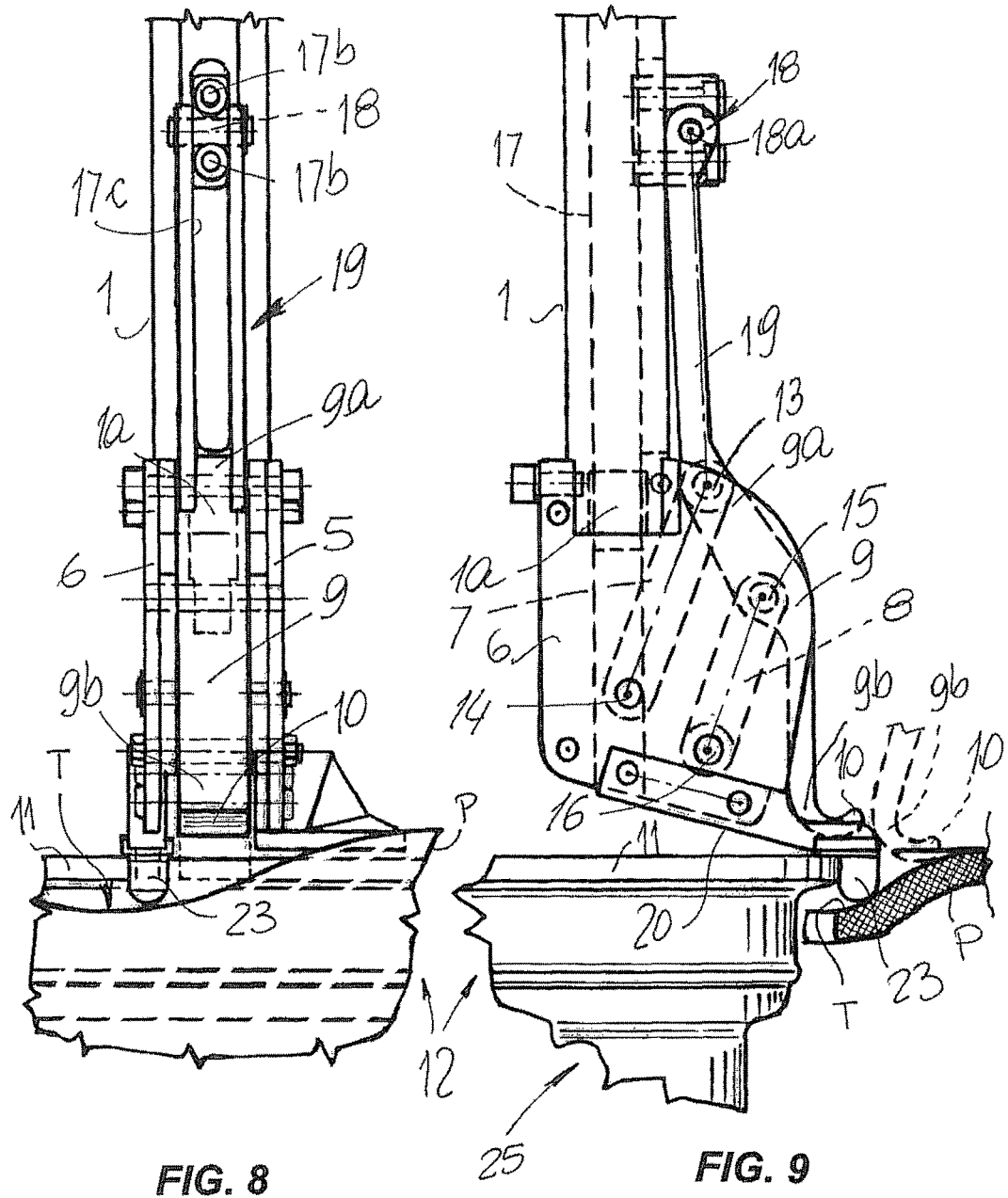
FIG. 8 is a front view of the tire-lever device during mounting of a tire.
FIG. 9 is the corresponding side view of FIG. 8.

Referring to FIG. 1, numeral 1 designates a support arm of a tire-changing machine 2 that has a base from which a column 3 extends and carries a swiveling transverse arm 4, having the support arm 1 supported at its free end.

Two vertical and parallel plates 5 and 6 are attached to the lower end 1a of the support arm 1.

Two pairs of connecting rods are hinged between the plates 5 and 6, i.e. each pair is hinged to a respective plate, and namely include first upper connecting rods 7 and second lower connecting rods 8.

An elongate body 9 is disposed between the two pairs of connecting rods 7 and 8, and is connected to the plates 5 and 6 by means of the pairs of connecting rods 7 and 8, such that it may make roto-translational movements relative to the plates 5 and 6.

The elongate body 9 is a tool to be used for demounting the tires "P".

Such tool is a tire-lever, hereinafter tire-lever 9, having an upper end 9a hinged to the concurrent end of the first upper connecting rod 7 by a hinge 13, whereas the opposite lower end 9b forms a hook 10 which is designed to be introduced between the bead "T" of a tire "P" and the edge 11 of the rim 12 on which such bead sits.

Referring to FIG. 4, the first upper connecting rod 7 is shown to have the end opposite to the hinge 13 hinged to the corresponding plate 6 by a hinge 14 that forms a first hinge point, whereas the second lower connecting rod 8 has a first end hinged to the tire-lever 9 by a hinge 15 and to the plate 6 by a hinge 16 that forms a second hinge point.

Furthermore, it shall be noted both that the hinges 14 and 16 are vertically offset and that the length of the first upper connecting rod 7 is greater than the length of the second lower connecting rod 8: For these reasons, when these connecting rods are rotated about their respective hinges 14 and 16, their opposite ends follow circular paths with different radiuses which, as better explained hereinafter, force the tire-lever 9 to move with compound roto-translational movements alternatively upwards and downwards.

The tire-lever 9 is driven by a fluid-dynamic actuator, not shown, which is associated with the support arm 1, as is known in the art, and has the shaft 17 slidably received therein.

The lower end of the shaft 17 has a concurrent end of a coupling rod 19 with coupled and parallel arms hinged thereto, the opposite end thereof being co-hinged to the hinge 13, as more clearly shown in FIG. 5.

The coupling rod 19 is hinged to the lower end of the shaft 17 by means of a hinge 18 whose hinge pin 18a transversely passes through a block 17a that is made to be integral with the shaft 17 by means of fastening bolts 17b and is guided in a sliding motion within a slot 17c longitudinally formed in the support arm 1.

The two plates 5 and 6 also have two respective brackets 20 fixed to their lower ends, supporting a conventional tool 21 that is typically used to complete extraction of the beads "T" of the tires "P" once the hook 10 has lifted a first portion thereof, while functionally cooperating with the rotating platform on which vehicle wheels are usually locked for demounting and mounting of tires, which usually equips tire changing machines.

As shown in detail in FIG. 5, the tool 21 comprises a slide surface 22 upon which the bead "T" of a tire "P" is designed to lie and slide, once it has been lifted by the tire-lever 9 and the rotating platform has been set in motion.

The slide surface is located on one side of the tire-lever 9, a peg 23 being provided on the other side, for contact with the edge 11 of the rim 12, and acting as a reference for positioning the tire-lever 9 in its proper operating position relative to the rim 12.

Referring to FIGS. 1-3, it shall be noted that the lateral profile of front sides, i.e. the sides facing outwards, of the two plates 5 and 6 is substantially identical to the lateral profile of the tire-lever 9.

Thus, when the tire-lever 9 is in a rest position, it is entirely hidden within the shape of the plates 5 and 6.

The operation of the tire-lever for tire-changing machines of the invention is as follows: when a tire changer has to demount a tire "P" of a vehicle wheel from its rim 12, he/she will lay the wheel on the rotating working platform, also known as "self-centering unit", and lock the rim 12 using the locking devices with which prior art tire-changing machines are equipped.

The tire is deflated beforehand and subjected to bead breaking by the tire changer using a pneumatically operated mechanical tool, simply known as bead breaker, with which the tire-changing machines are equipped on one side of their base.

After this step, the wheel is laid on the self-centering unit and the tire changer rotates the transverse arm 4 until the operating arm 1 reaches a position above the rim 12.

By adjustment of the angular and vertical position of the support arm 1 using the controls and actuator units of the tire-changing machine 2, the tire changer will place the contact and reference peg 23 against the edge 11 of the rim 12 and the tool 21 will lie on the upwardly facing part of the edge 11.

In this step, the tire-lever 9 is still kept in the rest position, i.e. retracted in a lifted position between the plates 5 and 6, and the first upper connecting rod 7 and the second lower connecting rod 8 are both rotated upwards: this state is shown in FIG. 1 and in FIGS. 4 and 6 by broken lines.

When mounting the tire, the tire changer operates the actuator that moves its shaft 17 toward the rim, whereupon the coupling rod 19 also moves downwards.

The latter causes the first upper connecting rod 7 to rotate about the hinge 13 where the second lower connecting rod 8 is forced to simultaneously rotate about the hinge 16 by the tire-lever 9 which is progressively pushed downwards by the coupling rod 19.

The difference between the lengths of the first upper connecting rod 7 and the second lower connecting rod 8 and the different positions of the hinges 14 and 16 about which they can rotate, impart a roto-translational motion to the tire-lever 9 toward or away from the rim 12, which allows the hook to follow a path that passes over the edge 11 without touching it (see FIG. 6) and to be later oriented and directed toward the bead fitting groove 25 of the rim 12, for introduction between a bead "T" and the edge 11, or away from it, for catching and extraction of the bead "T" from the edge 11 of the rim 12.

During introduction, the hook 10 presses upon the bead "T" of the tire "P", thereby bending it toward the bead fitting groove 25 and creates a passage between the bead "T" and the edge 11 of the rim 12: this state is shown in FIG. 4, where it is outlined by solid lines.

The hook 10 of the tire-lever 9 penetrates between the bead "T" and the edge 11 through this passage, and causes the bead "T" to pass over it.

Then, the tire changer reverses the action of the fluid-dynamic actuator and the tire-lever 9 is pulled back upwards, following the introduction path in the opposite direction.

Along this path, the hook 10 automatically catches the edge of the bead "T" which has in turn recovered its normal state, once the temporary pressure action has ceased, and lifts it over the edge 11 of the rim 12, until it comes over the slide surface 22 of the tool 21.

Then, the tire changer drives the self-centering unit into rotation, and the whole bead "T" is extracted from the edge 11 of the rim 12, thereby loosening the tire, which may be easily demounted.

While the tire-lever of the invention is not specially designed for a maneuver opposite to extraction of the beads "T", it may still be used to also facilitate mounting of the tires "P", as shown in FIGS. 8 and 9.

In this step, the tire changer keeps the tire-lever in its rest position, i.e. retracted between the two plates 5 and 6.

Then, once he/she has fitted the first lower bead "T" of a tire "P" onto the rim 12 locked in a lying position on the self-centering unit, he/she places the second upper bead "T" on the slide surface 22 of the tool 21 and bends it to pass it below the hook 10 and the contact peg 23, as schematically shown in FIGS. 8 and 9.

Now, he/she drives the self-centering unit into rotation and the combined pressure of the lower part of the hook 10 and the peg 23 helps the second upper bead "T" to pass over the edge 11 and to fully fit into the bead fitting groove 25.

The rotation of the self-centering unit allows to complete insertion of the entire bead "T" and hence, mounting of a tire "P" to its own rim 12.

The above disclosed invention was found to fulfill the intended objects.

The invention so conceived is susceptible to a number of changes and variants within the inventive concept.

Furthermore, all the details may be replaced by other technically equivalent parts.

In practice, any materials, shapes and sizes may be used as needed, without departure from the scope of the following claims.

The invention claimed is:

1. A tire-lever device for tire-changing machines (2) comprising:
   a substantially vertical support arm (1) which is coupled to a tire-changing machine (2) and has an upper end and an opposite lower end (1a);
   a couple of substantially vertical and parallel plates (5, 6) solidly extending from said opposite lower end (1a);
   a connecting rod system which is hinged between said couple of plates (5, 6) according to hinging axes which are transverse to the couple of plates, and which comprises a first upper connecting rod (7) and a second lower connecting rod (8);
   a tire-lever tool having an oblong body (9) defining one first end (9a) facing upward and one opposite second end (9b) shaped as a hook portion (10), which is hinged to said first connecting rod (7) and to said second connecting rod (8) and forming an articulated quadrilateral together with the latter and said plates (5, 6);
   an actuator (17) which rotates said connecting rod system and which is mounted on said support arm (1); and
   a connecting element (17a) of said actuator (17) to said connecting rod system;
   wherein said connecting element (17a) defines one end hinged to said actuator (17) and an opposite end directly hinged to said first end (9a) of said first end of said oblong body (9) of the tire-lever tool, and
   wherein said connecting element comprises a connecting rod (19) coupled to two parallel coupled arms which has an upper end hinged to said actuator (17) by a hinging member (18) and an opposite lower end which is co-hinged to said first connecting rod (7) and to said oblong body (9).

2. The device as claimed in claim 1, wherein said first upper connecting rod (7) has a length greater that said second lower connecting rod (8).

3. The device as claimed in claim 1, wherein said oblong body (9) is knee-shaped with a convexity facing oppositely said first and second connecting rods.

4. The device as claimed in claim 3, wherein said plates (5, 6) have respective sides facing said tire-lever tool which are knee-shaped substantially alike said shape of said oblong body (9).

5. The device as claimed in claim 1, wherein said actuator comprises a fluid-dynamic cylinder having a piston rod (17) which is movable along said support arm (1), one free end of said piston rod (17) being equipped with a joining block (17a) to which said upper end of said connecting rod (19) is hinged with said hinging member (18).

6. The device as claimed in claim 1, wherein said first upper connecting rod (7) has one end which is co-hinged both to said lower end of said connecting rod (19) and to said oblong body (9), and one opposite second end which is hinged to a first hinge point (14) between said substantially vertical plates (5, 6).

7. The device as claimed in claim 6, wherein said second lower connecting rod (8) has one first end hinged to a substantially middle section (15) of said oblong body (9) and one second end hinged in a second hinge point (16) arranged between said substantially vertical plates (5, 6) and vertically misaligned with respect to said first hinge point (14).

8. The device as claimed in claim 7, wherein said plates (5, 6) have respective sides facing said tire-lever tool which are knee-shaped substantially alike said shape of said oblong body (9), and wherein said second hinge point (16) is nearer to sides of said knee-shaped with respect of said first hinge point (14).

* * * * *